(12) United States Patent
Sterling et al.

(10) Patent No.: US 7,472,683 B2
(45) Date of Patent: Jan. 6, 2009

(54) IDLE AIR CONTROL VALVE WIRE STRESS RELIEF FEATURE AND ASSEMBLY AIDS

(75) Inventors: Yvon Sterling, Pain Court (CA); Craig Andrew Weldon, Chatham (CA)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 11/879,575

(22) Filed: Jul. 18, 2007

(65) Prior Publication Data

US 2008/0076294 A1 Mar. 27, 2008

Related U.S. Application Data

(60) Provisional application No. 60/831,628, filed on Jul. 18, 2006.

(51) Int. Cl.
*F16K 1/50* (2006.01)
(52) U.S. Cl. .................................................. 123/339.27
(58) Field of Classification Search ............ 123/339.27; 251/318, 319
See application file for complete search history.

(56) References Cited

U.S. PATENT DOCUMENTS

| 4,261,629 | A | 4/1981 | Reynolds et al. |
| 4,361,862 | A | 11/1982 | Martyniak |
| 4,452,201 | A | 6/1984 | Mazur et al. |
| 4,860,445 | A | 8/1989 | Jones |
| 6,464,530 | B1 | 10/2002 | Smith et al. |
| 6,666,432 | B2 * | 12/2003 | Ishigaki et al. ......... 251/129.18 |
| 6,834,637 | B1 | 12/2004 | Sharpton |

OTHER PUBLICATIONS

International Search Report—mailed Oct. 16, 2007; Siemens VDO Automotive Canada Inc.; PCT/CA2007/001259.

* cited by examiner

*Primary Examiner*—Erick Solis

(57) ABSTRACT

An idle air control valve assembly including a strain relief feature for a plurality of wire terminals that couple the control valve to a remote source. The strain relief feature prevents damage to solder joints attaching the wire leads to the valve assembly. Additional improvements in the idle air control valve assembly include a plurality of axially and radially extending protrusions on a peripheral surface of a valve body that assist in the alignment and retention of the valve body in a throttle body manifold of an internal combustion engine. The protrusions are operable in combination with a plurality of bolt flange tabs to ensure proper radial positioning of the valve body when inserted into the throttle body manifold.

12 Claims, 4 Drawing Sheets

IDLE AIR CONTROL VALVE WIRE STRESS RELIEF FEATURE AND ASSEMBLY AIDS

CROSS REFERENCE TO RELATED APPLICATIONS

This application claims the benefit of U.S. Provisional application Ser. No. 60/831,628, entitled GEN V IACV WIRE STRESS RELIEF FEATURE AND ASSEMBLY AIDS, filed Jul. 18, 2006, the contents of which are hereby incorporated by reference herein.

FIELD OF THE INVENTION

The present invention relates generally to improvements in an idle air control valve (IACV) that is disposed in the intake manifold of an internal combustion engine.

BACKGROUND OF THE INVENTION

Internal combusion engine applications utilize an IACV that is inserted into the intake manifold. One example used in smaller internal combustion engines is referred to as a Gen V IACV. The Gen I IACV is a current production part that is mounted externally to the intake manifold of automotive engines.

The IACV is electrically actuated by a remote source, and has a plurality of wire leads that are to remotely connected to the engine control unit (ECU). These wire leads are attached to the IACV terminals by a soldering/welding operation. During handling of the IACV, pulling on these wire leads can create stress on the solder joint, which stress, if excessive or as a result of continuous cycling, can lead to breaking of the wire or solder joint. This failure mode had been confirmed during design validation testing.

It would therefore be desirable to provide a strain relief feature for the wire leads to reduce stress on the solder leads.

It would further be desirable to provide provisions on the valve body of the IACV to enable easy indexing and retention of the IACV when inserted into the throttle body manifold of an internal combustion engine. Such proper radial positioning ensures that the wire routing path is correct for the electrical connections in the throttle body assembly.

SUMMARY OF THE INVENTION

In view of the foregoing, it is an object of the invention to relieve undue stress on solder joints for the wire leads on the IACV. In one expedient, a strain relief feature to capture the wires near the solder joint is incorporated on the valve body of the IACV. In this connection, each wire lead is placed within a support defined in the strain relief feature, and the strain relief structure is subsequently formed around the lead wire, for example, by a heat stake method. The forming of the support around the wire lead, and thus anchoring of the wire lead, provides a stress relief feature that precludes unwanted stress imposed on the wire from reaching the solder joint. Any excessive handling that stresses the wire leads is relieved at the anchor point and the solder joints are not directly affected.

It is a further object of the invention to provide an assembly aid that includes a ribbed sleeve. The sleeve is a cylindrical enclosure which is affixed to the connector. The sleeve and connector act to envelope the IACV core motor. The ribbing of the sleeve provides axial and radial support after insertion into the manifold. The ribs are protrusions on the sleeve perimeter designed to have interference contact with the bore of mating manifold. The multiple point contact ensures that IACV maintains axial alignment within the manifold bore. Such axial alignment is necessary to ensure that the IACV pintle/capnut maintains alignment with the valve seat of the manifold. The sleeve is preferably composed of a plastic material that provides sufficient flexure so as to ensure proper alignment through out a range of thermal exposure (i.e., −40 to +125 C. as per the manifold ambient environment specification). This flexure, in addition to axial support, provides additional tolerance to manifold vibration. The ribbed sleeve configuration provides resistance to movement of the IACV in the radial and axial directions to prevent damage to the internal motor of the IACV that can be caused by excessive engine vibration.

It is another object of the invention to provide an indexing feature combined with either a bolt flange or retainer ring. The indexing feature ensures the proper radial position of the IACV when inserted into the manifold.

In accordance with an aspect of the invention, an idle air control valve comprises: a plurality of electrical terminals for coupling a plurality of wire leads to the idle air control valve; and a strain relief member for supporting the plurality of wire leads disposed proximal to the electrical terminals. The strain relief member is axially elongated and comprises a plurality of transverse grooves. Preferably, the strain relief member is molded around the wire leads.

In accordance with another aspect of the invention, an idle air control valve for an internal combustion engine comprises: a plurality of protrusions extending axially along a peripheral surface of a valve body and radially with respect to a longitudinal axis extending through the valve body. Preferably, the protrusions are disposed on a sleeve affixed to the valve body.

In accordance with yet another aspect of the invention, an idle air control valve for an internal combustion engine, comprises: a peripheral surface comprising a plurality of protrusions extending axially along the peripheral surface and radially with respect to a longitudinal axis extending through a valve body; and a plurality of bolt flange tabs, each defining a hole therethrough for attaching the valve body/manifold of the internal combustion engine.

These and other advantages of the invention will be apparent to those of ordinary skill in the art by reference to the following detailed description and the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
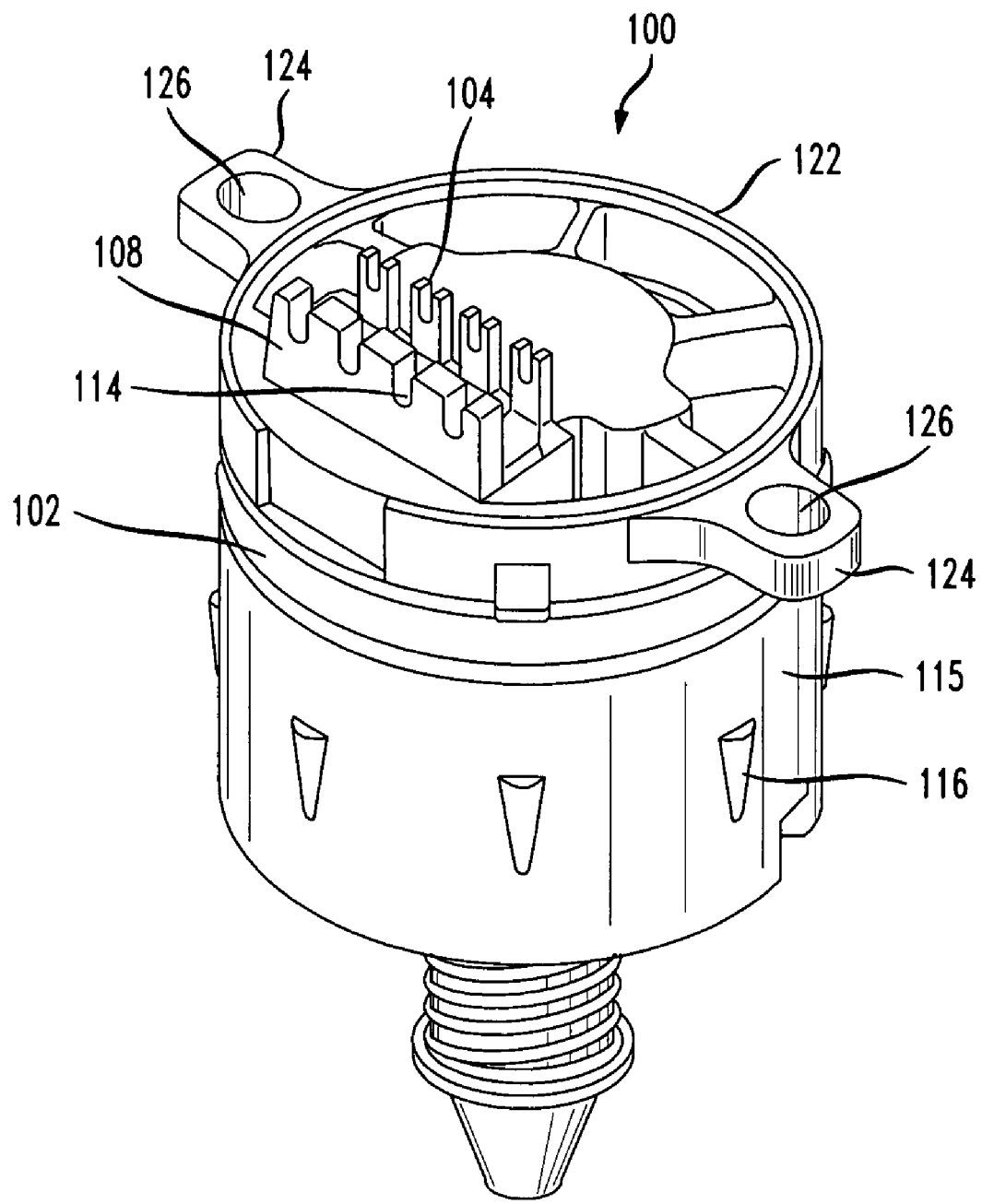
FIG. 1A is an isometric view of an IACV in accordance with an aspect of the invention.
Figure 1B:
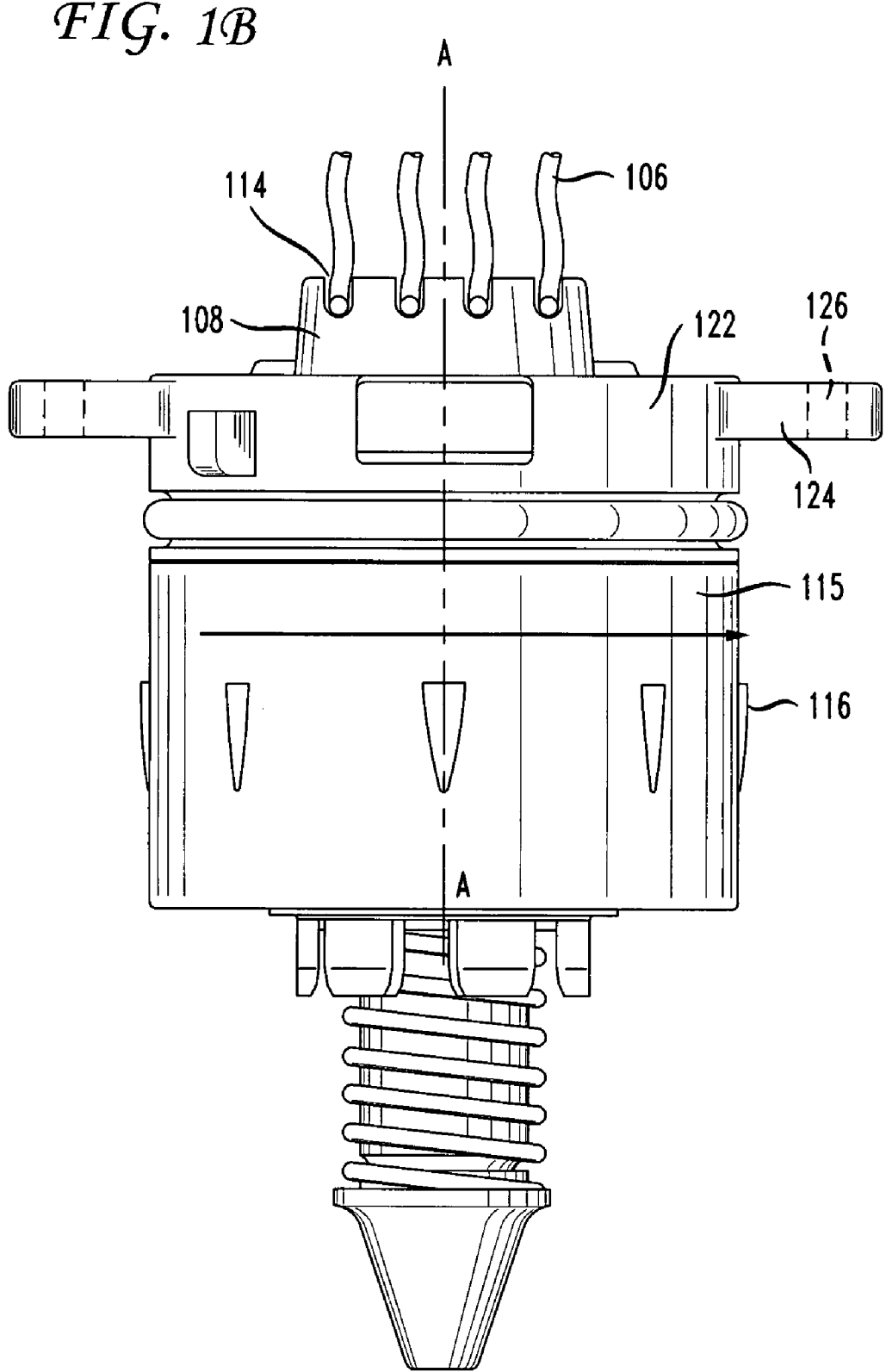
FIG. 1B is a front elevation thereof.
Figure 1C:
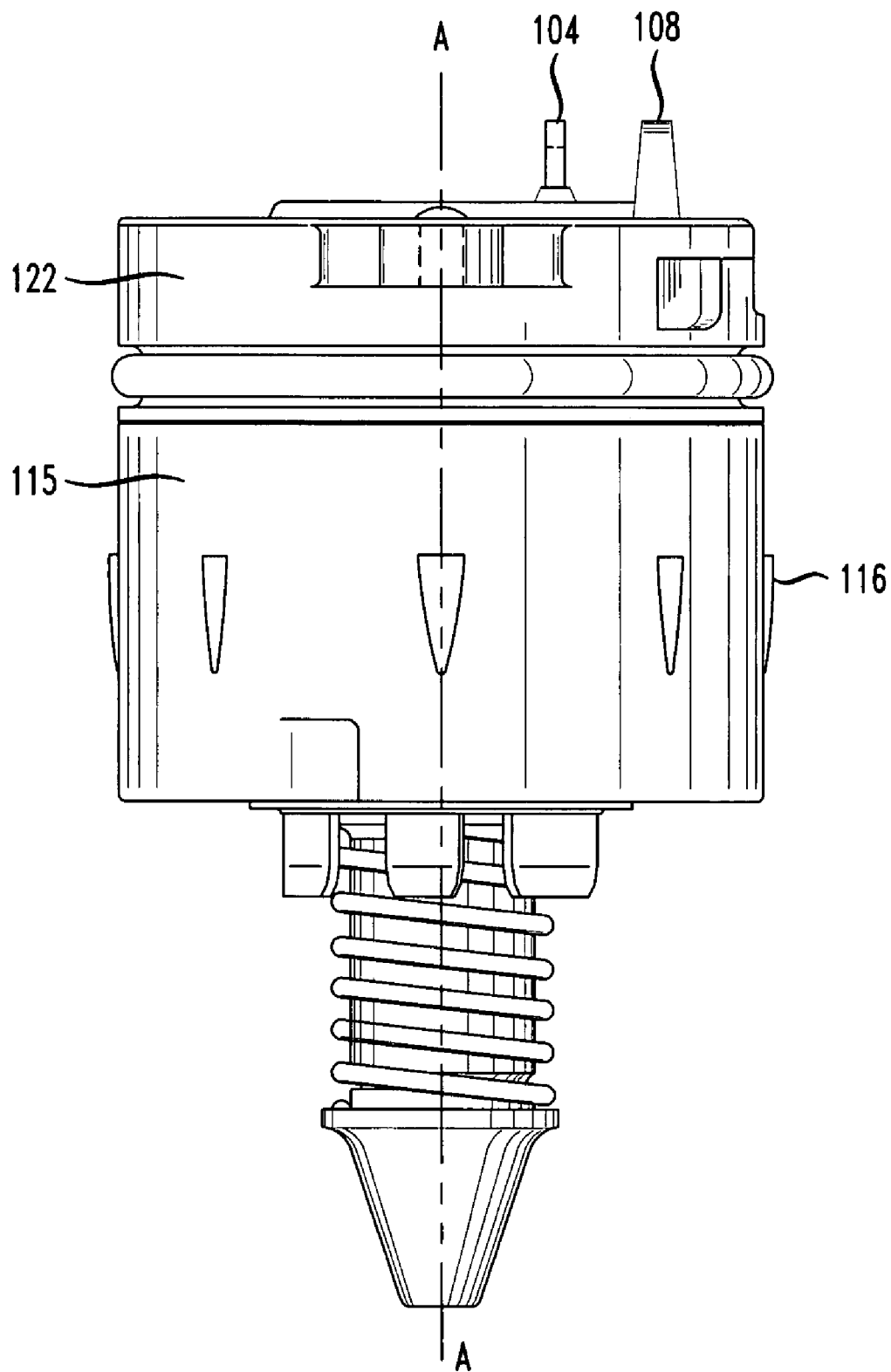
FIG. 1C is a side elevation thereof.

Referring to FIGS. 1a, 1b and 1c, there is depicted an idle air control valve (IACV) generally characterized by the reference numeral 100, and comprising a valve body 102 and a plurality of electrical terminals 104 for coupling the IACV to a remote source (not shown) via a plurality of wire leads 106. The wire leads 106 are typically soldered/welded in accordance with well-known techniques to respective terminals 104. In accordance with an aspect of the invention, a strain relief member 108 is disposed proximal to terminals 104 at a top end 110 of the IACV 100.

Strain relief member 108 is preferably composed of a thermoplastic structure that defines a pair of oppositely disposed upstanding walls 112a, 112b separated by a wall thickness "t" as best seen in FIG. 1C. The walls 112a, 112b may be tapered so as to have a varying thickness t when viewed as extending upwardly to facilitate molding. Strain relief member 108 includes a plurality of channels 114 extending therethrough to capture wire leads 106. Preferably, wire leads 106 are inserted into the respective channels 114 and then the strain relief member 108 is heat staked so as to melt the thermoplastic to reform around the wire leads 106. In this manner, any stress on wire leads 106 due to physical handling of the assembly or pulling on the wire leads will be relieved by strain relief member 108, thereby relieving stress on the solder/weld joints between wire leads 106 and terminals 104. Although strain relief member 108 is shown and described herein as a thermoplastic, it will be appreciated by those skilled in the art that other materials could be substituted in lieu thereof within the scope of the invention. For example, a thermoset or like material could be employed with the channels of the strain relief member undersized relative to the wire leads so as to capture the wire leads by an interference fit.

In accordance with another aspect of the invention, a ribbed sleeve 115 encapsulates or is part of valve body 102. The ribbed sleeve 115 comprises a plurality of protrusions 116 that extend axially and radially relative to a longitudinal axis A-A passing through valve body 102. The protrusions 116 are constructed and arranged to engage mating recesses 118 formed in a throttle body manifold 120 of an internal combustion engine. These protrusions 116 aid in centering the IACV in the axial and radial directions when mating the IACV to the throttle body manifold 120. Advantageously, protrusions 116 also provide secondary retention and vibration isolation functions. The protrusions 116 are sized so as to have an interference fit with the recesses 118 in the throttle body. The multiple points of contact provide proper axial alignment of the IACV to ensure that the IACV pintle/capnut is maintained in the correct alignment with the manifold's valve seat. Preferably, the ribbed sleeve 115 is constructed of a plastic material to provide sufficient flexure to ensure that alignment is maintained throughout the expected thermal environmental range (i.e., −40 to +125 C), per the manifold environmental specification. Such flexure, in addition to axial support, provides additional tolerance to manifold vibration.

Figure 2:
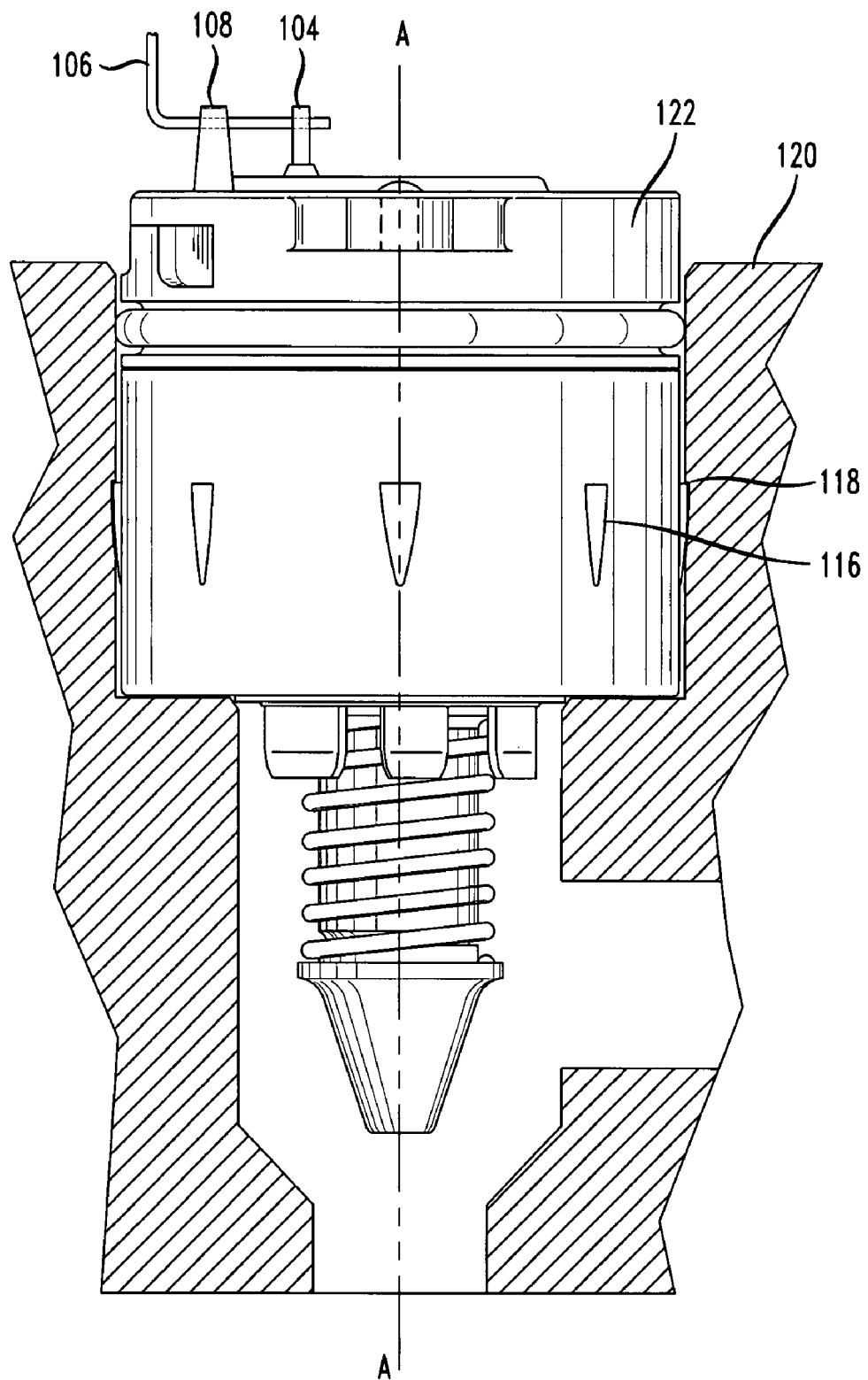
FIG. 2 is a partial section showing the IACV mounted in a throttle body of an internal combustion engine.

Another aspect of the invention resides in the use of a retainer ring 122 having a plurality of bolt flange tabs 124 to provide an indexing feature. The indexing feature is an assembly error proof, poke-yoke, that ensures proper radial positioning of the IACV when inserted into the manifold 120. Each bolt flange tab 124 includes a through-hole 126 defined therethrough for the mounting hardware on the manifold 120. The retainer ring 122 is preferably sized so as to provide an interference fit between the ribbed sleeve 115 and manifold bore 128 (see FIG. 2). In addition, the retainer ring 122 is sized so that the insertion force required to install the IACV 100 in the manifold 120 is significantly less than an extraction force necessary to remove the same.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while the method is disclosed herein with respect to tubular components of a fuel injector, the techniques and configurations of the invention may be applied to other tubular components where a hermetic weld is required. It is to be understood that the embodiments shown and described herein are only illustrative of the principles of the present invention and that various modifications may be implemented by those skilled in the art without departing from the scope and spirit of the invention.

What is claimed is:

1. An idle air control valve for an internal combustion engine, comprising:
a plurality of protrusions extending axially along a peripheral surface of a valve body and radially with respect of a longitudinal axis extending through the valve body.

2. The idle air control valve recited in claim 1, wherein the protrusions are disposed on a sleeve affixed to the valve body.

3. The idle air control valve recited in claim 1, furher comprisising:
a plurality of electrical terminals for coupling a plurality of wire leads to the idle air control valve; and
a strain relief member for supporting the plurality of wire leads.

4. The idle air control valve recited in claim 3, wherein the strain relief member is axially elongated and coprises a plurality of transverse grooves.

5. The idle air control valve recited in claim 3, wherein the strain relief member is molded around the wire leads.

6. The idle air control valve recited in claim 3, wherein the wire leads are soldered to the electrical terminals and the strain relief member is molded around the wire leads.

7. An idle air control valve for an internal combustion engine, comprising:
a peripheral surface comprising a plurality of protrusions extending axially along The peripheral surface and radially with respect to a longitudinal axis extending through a valve body; and
a plurality of bolt flange tabs, each defining a hole therethrough for attaching the valve body to the internal combustion engine.

8. The idle air control valve recited in claim 7, further comprising
a plurality of electrical terminals for coupling a plurality of wire leads to the idle air control valve; and
a strain relief member for supporting the plurality of wire leads.

9. The idle air control valve recited in claim 8, wherein the strain relief member is axially elongated and comprises a plurality of transverse grooves.

10. The idle air control valve recited in claim 8, wherein the strain relief member is axially elongated and comprises a plurality of transverse grooves.

11. The idle air control valve recited in claim 8, wherein the strain relief member is molded around the wire leads.

12. The idle air control valve recited in claim 8, wherein the wire leads are soldered to the electrical terminals and the strain relief member is molded around the wire leads.

* * * * *